(12) United States Patent
Duquenoy-bernaudin et al.

(10) Patent No.: US 8,814,037 B2
(45) Date of Patent: Aug. 26, 2014

(54) SUBCRIPTION OF A USER

(71) Applicant: Business Objects Software Ltd., Dublin (IE)

(72) Inventors: Ingrid Duquenoy-bernaudin, Vancouver (CA); Sheng Li, Coquitlam (CA); Siu Man Hsieh, Burnaby (CA); Charles Wilson, Vancouver (CA); David Chan, Richmond (CA); Huaizhi Guo, Coquitlam (CA); Connor Lowe, Vancouver (CA)

(73) Assignee: SAP AG, Walldorf (DE)

( * ) Notice: Subject to any disclaimer, the term of this patent is extended or adjusted under 35 U.S.C. 154(b) by 107 days.

(21) Appl. No.: 13/665,108

(22) Filed: Oct. 31, 2012

(65) Prior Publication Data

US 2014/0117078 A1    May 1, 2014

(51) Int. Cl.
   *G06K 17/00*    (2006.01)
(52) U.S. Cl.
   USPC .......................................................... 235/375
(58) Field of Classification Search
   USPC .................................................. 235/375, 494
   See application file for complete search history.

(56) References Cited

U.S. PATENT DOCUMENTS

2008/0017722 A1*  1/2008  Snyder et al. ................. 235/494

OTHER PUBLICATIONS

"HP Celebrates 35 Years of Handheld Calculator Innovation", [Online]. Retrieved from the Internet: <URL: http://h20331.www2.hp.com/Hpsub/cache/457008-0-0-225-121.html>, (2007), 7 pgs.
"IEEE 802.15 WPAN Task Group 6 (TG6) Body Area Networks", IEEE Standards Association Jun. 9, 2011, [Online]. Retrieved from the Internet <URL: http://ieee802.org/15/pub/TC6.html>, (Accessed Jan. 21, 2013), 3 pgs.
"SAP® StreamWork™ Transform the Way You Work by Bringing Method to the Madness", [Online]. Retrieved from the Internet: <URL: http://www.sapstreamwork.com/sites/streamwork/files/sap_streamwork.pdf>, (Accessed Jan. 21, 2013), 2 pgs.
Schecter, Bruce, "The Body Electric", [Online]. Retrieved from the Internet: <URL: http://domino.research.ibm.com/comm/wwwr_thinkresearch.nsf/pages/pan197.html>, (Accessed Jan. 21, 2013), 4 pgs.
Zimmerman, T. G., "Personal Area Networks: Near-field intrabody communication", IBM Systems Journal (USA), 35 (3-4), (1996), 609-17.

* cited by examiner

*Primary Examiner* — Daniel Hess
(74) *Attorney, Agent, or Firm* — Schwegman Lundberg & Woessner, P.A.

(57) ABSTRACT

A machine may be configured to subscribe a user to a data feed that corresponds to an activity. The machine may generate an optically scannable code that encodes an activity identifier of the activity. The machine may cause a first device to access this optically scannable code, and the first device may present the optically scannable code to a second device. The second device may scan the optically scannable code, and the machine may detect that the optically scannable code has been scanned by the second device. In response to this detection, the machine may subscribe a user of the second device to a data feed that corresponds to the activity. Hence, a first user may present the optically scannable code using one device, and a second user can scan the optically scannable code using another device and be subscribed to the data feed for the activity.

25 Claims, 9 Drawing Sheets

US 8,814,037 B2

SUBCRIPTION OF A USER

TECHNICAL FIELD

The subject matter disclosed herein generally relates to the processing of data. Specifically, the present disclosure addresses systems and methods to facilitate subscription of the user.

BACKGROUND

A machine (e.g., server machine or a user's device, which may be denoted a "first device") may form all or part of a network-based system (e.g., a system of modules with access to a network) that provides one or more services to one or more users of the network-based system. Examples of network-based systems include business management systems, project management systems, workflow management systems, event coordination systems (e.g., calendaring systems or scheduling systems), commerce systems (e.g., shopping websites or auction websites), publication systems (e.g., classified advertisement websites), social network systems (e.g., Facebook® or Twitter®), and any suitable combinations thereof.

In some situations, users of a network-based system may access a service from various devices (e.g., smart phones, set-top boxes, personal computers, or tablet computers). For example, one user may access a service from his smart phone by connecting to the network-based system via a network (e.g., the Internet), while another user may access the service from her tablet computer by connecting to the network-based system via another network (e.g., a private network).

BRIEF DESCRIPTION OF THE DRAWINGS

Some embodiments are illustrated by way of example and not limitation in the figures of the accompanying drawings.

DETAILED DESCRIPTION

Figure 1:
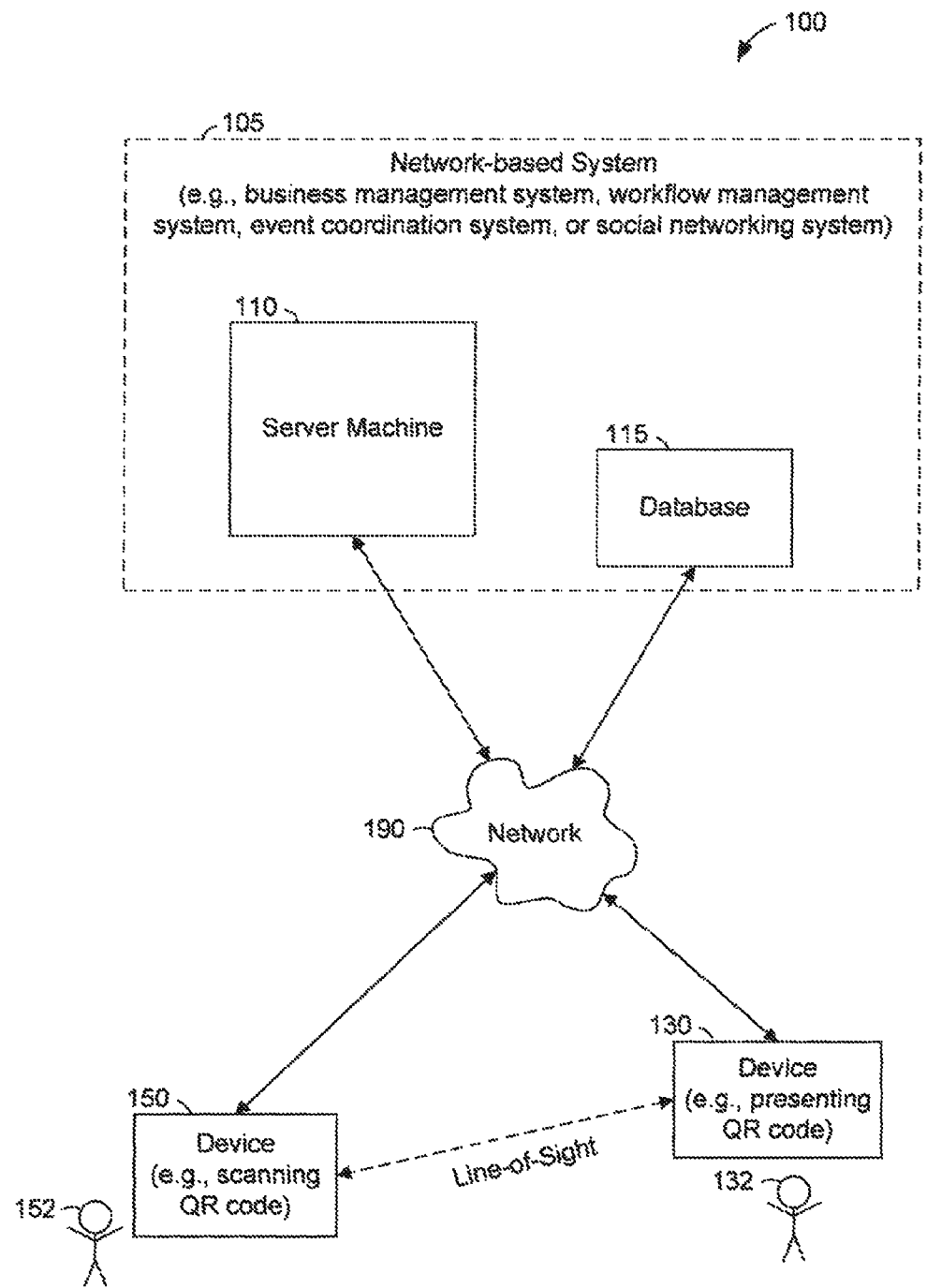
FIG. 1 is a network diagram illustrating a network environment suitable for subscription of the user, according to some example embodiments.

Example methods and systems are directed to subscription of a user. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A network-based system may provide a service that supports an activity in which users may participate (e.g., as participants, attendees, subscribers, or otherwise associated users). Examples of activities include an event (e.g., a conference scheduled by the service), a project (e.g., a business task managed by the service), a publication (e.g., an online newsletter or informational website maintained by the service), a discussion (e.g., an online conversation administered by the service), and any suitable combination thereof. Depending on various circumstances, an activity may be or include a data feed (e.g., a continuous or intermittent stream of information such as news, updates, version, revisions, blog postings, micro-blog postings, status changes, or any suitable combination thereof).

A machine (e.g., server machine) or a first device of a first user may form all or part of the network-based system and may be configured (e.g., by one or more software modules) to subscribe or allow subscription of another user (e.g., a second user) of the network-based system to a data feed that corresponds to an activity that is supported (e.g., tracked, facilitated, administered, scheduled, or managed) by the network-based system. According to various example embodiments, the machine or the first device may generate an optically scannable code (e.g., a barcode or a quick response (QR) code). This optically scannable code may encode an activity identifier that identifies the activity (e.g., with respect to the service provided by the network-based system). The machine or the first device may cause the first device to access this generated optically scannable code (e.g., by the machine providing the optically scannable code to the first device, or by the first device reading the optically scannable code from a its memory or from the machine), an the first device may then present the optically scannable code (e.g., on a display screen of the device or on the output of a printer connected to the device) to a second device of a second user.

The second device may scan (e.g., by photographing or otherwise automatically capturing data from) the optically scannable code, and the machine, the first device, or the second device may detect that the optically scannable code has been scanned by the second device. For example, the machine or the first device may receive a notification (e.g., an alert or request) from the second device via a network. As another example, the second device may detect that it has scanned the optically scannable code presented by the first device. In response to this detection, the machine, the first device, or the second device may subscribe the second user to a data feed that corresponds to the activity identified by the activity identifier. Accordingly, the first user may use his first device to present the optically scannable code, and the second user may use her second device to scan the optically scannable code and automatically be subscribed to the data feed that corresponds to the activity. Further details are discussed below with respect to FIG. 1-9.

FIG. 1 is a network diagram illustrating a network environment 100 suitable for subscribing the second user to the data feed that corresponds to the activity, according to some example embodiments. The network environment 100 includes a server machine 110, a database 115, and devices 130 and 150, all communicatively coupled together via a network 190. The server machine 110, the database 115, or both, may form all or part of a network-based system 105. As noted above, the network-based system 105 may be or include a business management system, a workflow management system, an event coordination system, a social networking system, or any suitable combination thereof. The server machine 110, the database 115, and the devices 130 and 150 may each be implemented in a computer system, in whole or in part, as described below with respect to FIG. 9.

The server machine 110 may provide one or more services in support of an activity. As noted above, the activity may be or include a data feed to which one or more users may subscribe. In some example embodiments, one or more users may subscribe directly to the activity. In certain example embodiments, one or more users may join the activity as a participant, a subscriber, or both. The database 115 may store a data record that corresponds to the activity, and this data record may indicate (e.g., identify or reference) those users that are participants, subscribers, or both, for the activity. The database 115 may store a data record that corresponds to a particular user, and such a data record may indicate that a particular user corresponds to a particular activity (e.g., as a participant, a subscriber, a host, a member, an attendee, a moderator, an administrator, a manager, or any suitable combination thereof).

The device 130 (e.g., a first device) may be configured (e.g., by a software application, applet, or app) to present (e.g., display or print) an optically scannable code. The device 150 (e.g., a second device) may be configured to scan (e.g., optically scan) the optically scannable code. In some example embodiments, the devices 130 and 150 are physically located, positioned, or oriented such that there is a line-of-sight (e.g., a sufficiently obstructed view, which may include a clear view) from the device 150 to the device 130. Accordingly, the ability for the device 150 to scan the optically scannable code presented by the device 130 may be controlled by controlling (e.g., obstructing or clearing) the line-of-sight between the devices 130 and 150.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
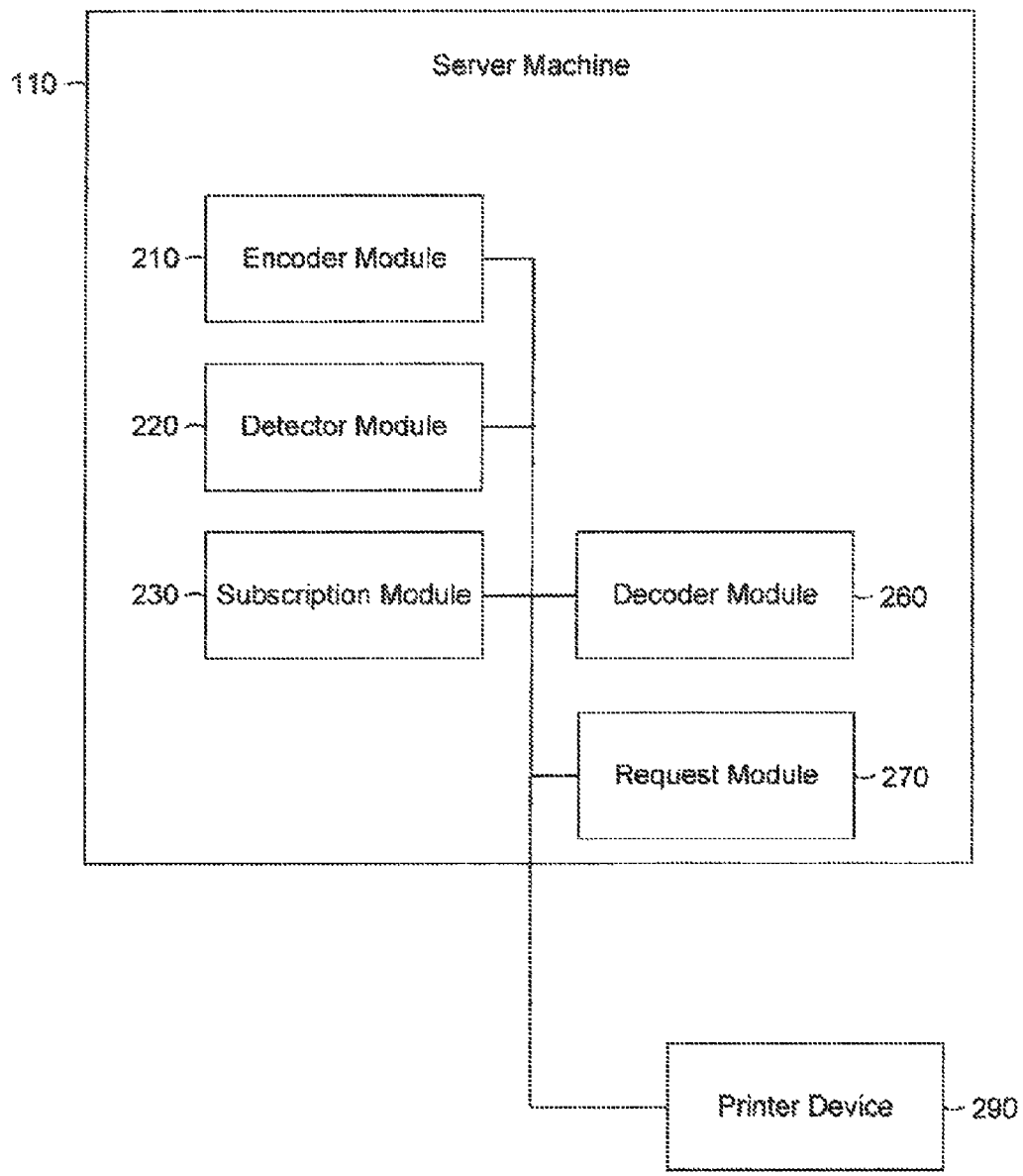
FIG. 2 is a block diagram illustrating components of a server machine suitable for subscription of a user, according to some example embodiments.

FIG. 2 is a block diagram illustrating components of the server machine 110, according to some example embodiments. In various example embodiments, the server machine 110 performs all or part of the methodologies discussed below with respect to FIG. 6-8, using some or all of the modules discussed herein. In such example embodiments, the server machine 110 may include an encoder module 210, a detector module 220, a subscription module 230, as well as a decoder module 260 and a request module 270, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

As shown, the server machine 110 may be connected to a printer device 290. The printer device 290 may be configured to print information (e.g., an optically scannable code) onto paper (e.g., a poster or a sheet of paper), fabric (e.g., a shirt, jacket, or necktie), a three-dimensional object (e.g., a mug or a badge), or any suitable combination thereof. Accordingly, the printer device 290 may configure or otherwise enable the server machine 110 to present the optically scannable code by printing the optically scannable code.

The encoder module 210 may be configured to generate an optically scannable code (e.g., a one-dimensional barcode, a two-dimensional code, a QR code, a matrix code, an "Aztec" code, a "PDF417" code, or any suitable combination thereof). As noted above, the optically scannable code may encode an activity identifier of an activity supported by the network-based system 105. Furthermore, the activity may correspond to the user 132 (e.g., first user). For example, the user 132 may be a participant, a subscriber, a host, a member, an attendee, a moderator, an administrator, a manager, or any suitable combination thereof, for the activity.

The encoder module 210 may be configured to cause the optically scannable code to be accessed by the device 130 (e.g., a first device). In the server machine 110, the encoder module 210 may cause the server machine 110 to provide the optically scannable code to the device 130 via the network 190 (e.g., in response to a request received from the device 130). In some example embodiments, the optically scannable code is provided in response to a request received from the device 130 for provision of the optically scannable code that encodes the activity identifier of the activity The detector module 220 may be configured to detect that the device 150 (e.g., a second device) has scanned the optically scannable code that encodes the activity identifier (e.g., as presented by the device 130). In the server machine 110, the detector module 220 may perform this detection by detecting (e.g., receiving) a communication from the device 150. For example, the detector module 220 may receive a notification that a scan of the optically scannable code has been performed by the device 150. As another example, the detector module 220 may receive a request from the device 150 that the user 152 (e.g., second user) become a subscriber to the activity or to a data feed that corresponds to the activity, a participant in the activity or in a data feed that corresponds to the activity, or any suitable combination thereof.

The subscription module 230 may be configured to subscribe the user 152 to the activity (e.g., as a subscriber or participant in the activity), to a data feed that corresponds to the activity (e.g., as a subscriber or participant in the data feed), or to any suitable combination thereof. This subscription of the user 152 may be based on the activity identifier encoded in the optically scannable code. According to various example embodiments, the subscription module 230 is configured to subscribe the user 152 by indicating the user 152 as a participant or a subscriber in a data record that corresponds to the activity (e.g., a data record stored in the database 115). In certain example embodiments, the subscription module 230 is configured to allow (e.g., enable or authorize) the subscription of the user 152, based on the activity identifier. The subscription module 230 may be configured to configure the device 150 (e.g., by configuring or updating a software application, applet, or app executable thereon) to receive information about a topic of the activity (e.g., an activity topic), about the user 132 (e.g., contact details or information about the role of the user 132 in the activity), or about both. In some example embodiments, the cavity is or pertains to an event (e.g., a scheduled business conference), and the subscription module 230 may be configured to provide information about the event to the device 150 (e.g., for presentation to the user 152).

The functions of the decoder module 260 and the request module 270, when present in server machine 110, are discussed below with respect to FIG. 4.

Figure 3:
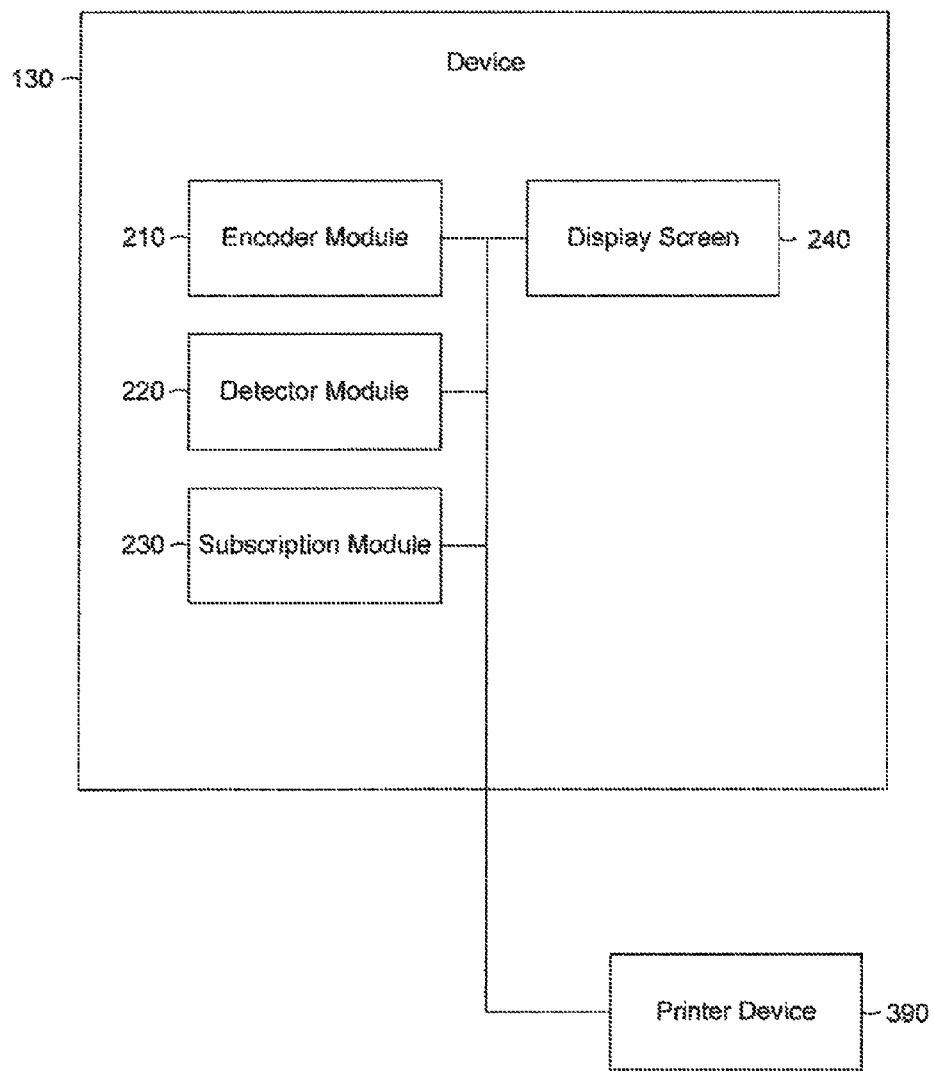
FIG. 3 is a block diagram illustrating components of a device suitable for presenting an optically scanning code (e.g., an optically-scannable code), according to some example embodiments.

FIG. 3 is a block diagram illustrating components of the device 130, which may be configured to present an optically scannable code (e.g., generated by itself or by the server machine 110), according to some example embodiments. In certain example embodiments, the device 130 performs all or part of the methodologies discussed below with respect to FIG. 6-8, using some or all of the modules discussed herein. In such example embodiments, the device 130 may include the encoder module 210 (e.g., as described above with respect to FIG. 2), the detector module 220 (e.g., as described above with respect to FIG. 2), and the subscription module 230 (e.g., as described above with respect to FIG. 2), as well as a display screen 240, all configured to communicate with each other (e.g., via a bus, shared memory, or a switch). As shown, the device 130 may be connected to a printer device 390.

As noted above, the encoder module 210 may be configured to generate the optically scannable code (e.g., as discussed above with respect to FIG. 2). Moreover, the encoder module 210 may be configured to cause the optically scannable code to be accessed by the device 130 (e.g., first device). In situations where the device 130 generated the optically scannable code, the encoder module 210 may access (e.g., read) the optically scannable code from a memory (e.g., random-access or read-only) of the device 130 or other data repository of the device 130. In situations where the server machine 110 has generated the optically scannable code, the encoder module 210 may cause the server machine 110 to provide the optically scannable code to the device 130 via the network 190. For example, the encoder module 210 may communicate a request to the server machine 110 for provision of the optically scannable code to the device 130, which may accordingly cause the server machine 110 to provide the optically scannable code to the device 130 in response to the request.

The display screen 240 may be configured to display the optically scannable code (e.g., to any device with a clear line-of-sight to the display screen 240, to the device 130, or both). In some example embodiments, the device 130 is configured (e.g., by a software application, applet, or app executable thereon) to present the optically scannable code by displaying the optically scannable code on the display screen 240. Accordingly, the display screen 240 may configure or otherwise enable the device 130 to present the optically scannable code by displaying the optically scannable code. In some example embodiments, the display screen 240 thus configures or enables the device 130 to present the optically scannable code to the device 150 (e.g., to allow the user 152 to be subscribed to the activity, to a data feed that corresponds to the activity, or to both).

The printer device 390 may be configured to print information (e.g., the optically scannable code) onto paper (e.g., a poster or a sheet of paper), fabric (e.g., a shirt, jacket, or necktie), a three-dimensional object (e.g., a mug or a badge), or any suitable combination thereof. Accordingly, the printer device 390 may configure or otherwise enable the device 130 to present the optically scannable code by printing the optically scannable code. In some example embodiments, the printer device 390 thus configures or enables the device 130 to present the optically scannable code to the device 150 (e.g., to allow the user 152 to be subscribed to the activity, to a data feed that corresponds to the activity, or to both).

As noted above, the detector module 220 may be configured to detect that the device 150 (e.g., second device) has scanned the optically scannable code that encodes the activity identifier (e.g., as presented by the display screen 240). In the device 130, the detector module 220 may perform this detection by detecting (e.g., receiving or accessing) a communication from the device 150. For example, the detector module 220 may receive a notification that a scan of the optically scannable code has been performed by the device 150. As another example, the detector module 220 may receive a request from the device 150 that the user 152 (e.g., second user) become a subscriber to the activity or to a data feed that corresponds to the activity, a participant in the activity or in a data feed that corresponds to the activity, or any suitable combination thereof.

As noted above, the subscription module 230 may be configured to subscribe the user 152 to the activity (e.g., as a subscriber or participant in the activity), to a data feed that corresponds to the activity (e.g., as a subscriber or participant in the data feed), or to any suitable combination thereof. As described above, the subscription module 230 may be configured to indicate the user 152 as a participant or a subscriber in a data record that corresponds to the activity. The subscription module 230 may be configured to configure the device 150 (e.g., by configuring or updating a software application, applet, or app executable thereon) to receive information about a topic of the activity, about the user 132, or about both. In some example embodiments, the activity is or pertains to an event, and the subscription module 230 may be configured to provide information about the event to the device 150.

Figure 4:
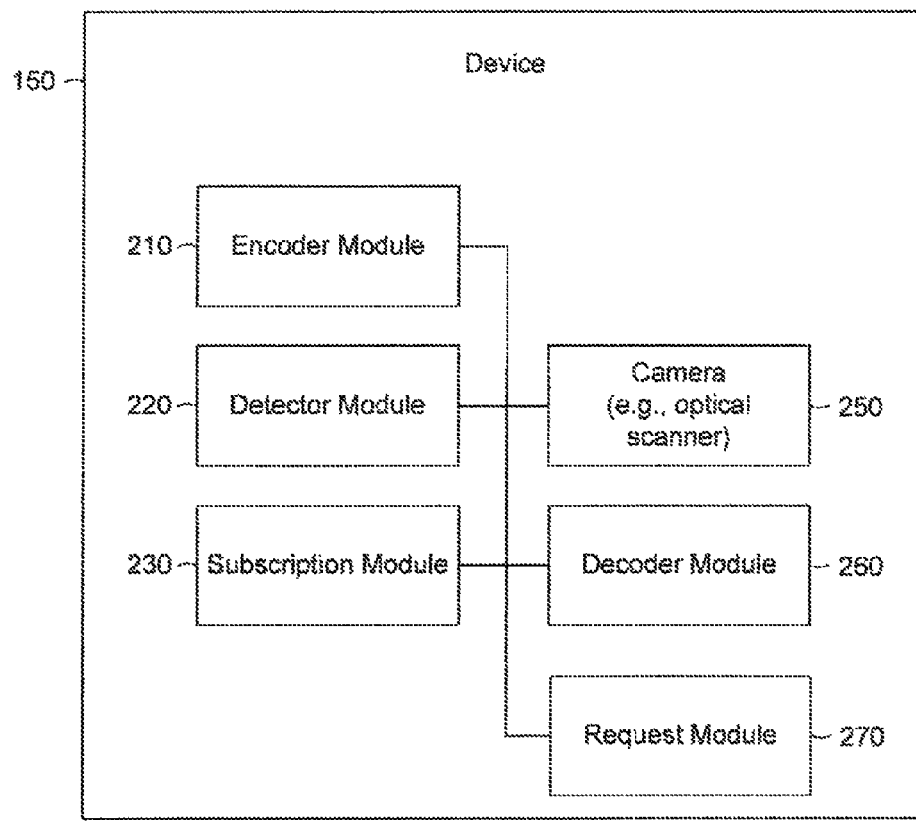
FIG. 4 is a block diagram illustrating components of a device suitable for scanning an optically scannable code, according to some example embodiments.

FIG. 4 is a block diagram illustrating components of the device 150, which may be configured to scan an optically scannable code (e.g., presented by the device 130), according to some example embodiments. In certain example embodiments, the device 150 performs some or all of the methodologies discussed below with respect to FIG. 6-8. In such example embodiments, the device 150 may include the encoder module 210 (e.g., as described above with respect to FIG. 2), the detector module 220 (e.g., as described above with respect to FIG. 2), and the subscription module 230 (e.g., as described above with respect to FIG. 2), as well as a camera 250 (e.g., an optical scanner), the decoder module 260, and the request module 270, all configured to communicate with each other (e.g., via a bus, shared memory, or a switch).

As noted above, the encoder module 210 may be configured to generate the optically scannable code (e.g., as discussed above with respect to FIG. 2). Moreover, the encoder module 210 may be configured to cause the optically scannable code to be accessed by the device 130 (e.g., first device). In situations where the device 150 generated the optically scannable code, the encoder module 210 may access (e.g., read) the optically scannable code from a memory (e.g., random-access or read-only) of the device 150 or other data repository of the device 150. In situations where the server machine 110 has generated the optically scannable code, the encoder module 210 may cause the server machine 110 to provide the optically scannable code to the device 130 via the network 190. For example, the encoder module 210 may communicate a request to the server machine 110 for provision of the optically scannable code to the device 130, which may accordingly cause the server machine 110 to provide the optically scannable code to the device 130 to response to the request.

As noted above, the detector module 220 may be configured to detect that the device 150 (e.g., second device) has scanned the optically scannable code that encodes the activity identifier (e.g., as presented by the display screen 240). In the device 150, the detector module 220 may perform this detection by detecting (e.g., receiving or accessing) an image of the optically scannable code from the camera 250 of the device 150.

The camera 250 may be configured to optically scan one or more optically scannable codes. Such as optically scannable code may be presented to the camera 250 with a line-of-sight (e.g., a clear and unobstructed line-of-sight) between the camera 250 and the optically scannable code. For example, the camera 250 may be a built-in camera within the device 150, which may be a smart phone or a tablet computer. In some example embodiments, the camera 250 is or includes an optical scanner (e.g., a barcode reader).

The decoder module 260 may be configured to decode one or more optically scannable codes that have been optically scanned by the camera 250. As noted above, an optically scannable code may encode an activity identifier of an activity. Accordingly, the decoder module 260 may decode the optically scannable code, an thereby decode the activity identifier encoded therein. As discussed below with respect to FIG. 5, an optically scannable code may encode additional information (e.g., locators, references, user identifiers, and any suitable combination thereof). Accordingly, in various example embodiments, the decoder module 260 is configured to decode such additional information. In example embodiments where the decoder module 260 is within the server machine 110, the decoder module 260 may access (e.g., receive or retrieve) an optically scannable code that has been scanned by the camera 250.

The request module 270 may be configured to create and send one or more requests in response to information decoded by the decoder module 260 (e.g., an activity identifier encoded in an optically scannable code). For example, the request module 270 may send a request (e.g., to the server machine 110 or to the device 130) that the user 152 (e.g., second user) become a subscriber to the activity or to a data feed that corresponds to the activity, a participant in the activity or in a data feed that corresponds to the activity, or any suitable combination thereof.

According to various example embodiments, the request module 270 is configured to provide a notification that the device 150 has performed an optical scan of an optically scannable code. For example, the request module 270 may send a notification (e.g., to the server machine 110 or to the device 130) that a scan of the optically scannable code has been performed by the device 150. In example embodiments were the request module 270 is within the server machine 110, the request module 270 may communicate with the decoder module 260 and provide one or more requests notifications based on information (e.g., locators, references, activity identifiers, user identifiers, and any suitable combination thereof) decoded by the decoder module 260.

As noted above, the subscription module 230 may be configured to subscribe the user 152 to the activity (e.g., as a subscriber or participant in the activity), to a data feed that corresponds to the activity (e.g., as a subscriber or participant in the data feed), or to any suitable combination thereof. As described above, the subscription module 230 may be configured to indicate the user 152 has a participant or a subscriber in a data record that corresponds to the activity. The subscription module 230 may configure the device 150 (e.g., by configuring or updating a software application, applet, or app executable thereon) to receive information about a topic of the activity, about the user 132, or about both. In some example embodiments, the activity is or pertains to an event, and the subscription module 230 may be configured to access (e.g., retrieve or request) information about the event for presentation to the user 152.

Figure 5:
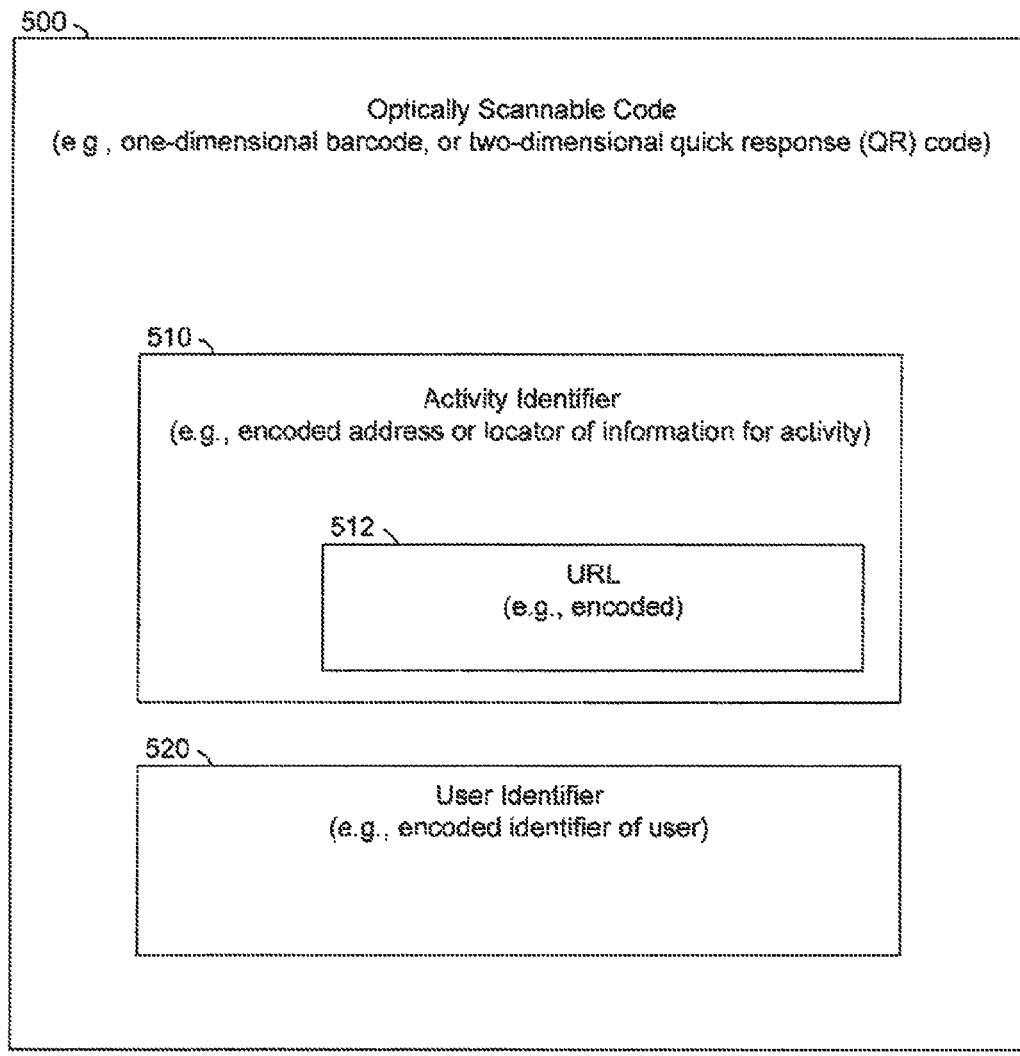
FIG. 5 is a block diagram illustrating an optically scannable code, according some example embodiments.

FIG. 5 is a block diagram illustrating an optically scannable code 500, according to some example embodiments. The optically scannable code 500 may be any code that is presentable and readable using optical (e.g., visual or visible) wavelengths of light (e.g., displayable on a display screen 240 and scannable with the camera 250). According to various example embodiments, the optically scannable code 500 may be or include a barcode. For example, the optically scannable code 500 may be or include a one-dimensional barcode, a two-dimensional barcode (e.g., a QR code), or any suitable combination thereof.

In the example shown, at least a portion of the optically scannable code 500 may be or include an activity identifier 510 that identifies an activity supported by the network-based system 105. Accordingly, the optically scannable code 500 may encode the activity identifier 510. In some example embodiments, the activity identifier 510 is an address or locator of information that corresponds to the activity. As shown in FIG. 5, an example of such a locator is a URL 512 (e.g., a URL of a website or document that publishes information regarding the activity), which may be encoded within the activity identifier 510 and encoded within the optically scannable code 500.

Furthermore, at least a portion (e.g., another portion) of the optically scannable code 500 may be or include a user identifier 520 that identifies the user 132. The user 132 may correspond to the activity (e.g., as a participant, a subscriber, a host, a member, an attendee, a moderator, an administrator, a manager, or any suitable combination thereof). In some example embodiments, the user identifier 520 is a universally unique identifier (UUID) for the user 132. Other examples of the user identifier 520 include a username of the user 132, an email address for the user 132, a nickname for the user 132, an account number for the user 132, an employee number for the user 132, or any suitable combination thereof. As shown in FIG. 5, the user identifier 520 may be encoded within the optically scannable code 500.

Figure 6:
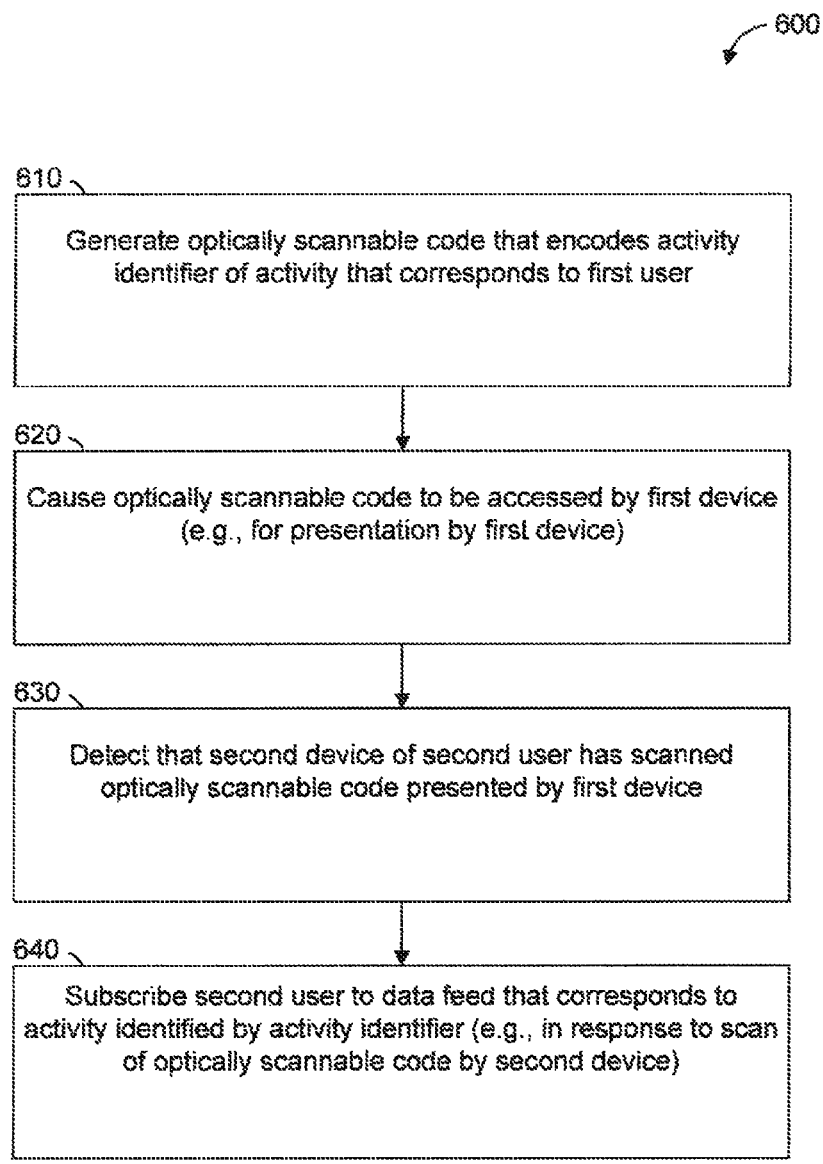
FIG. 6-8 are flowcharts illustrating operations of a server machine or a device in performing a method of subscribing a user to an activity or to a data feed for an activity, according to some example embodiments.
Figure 7:
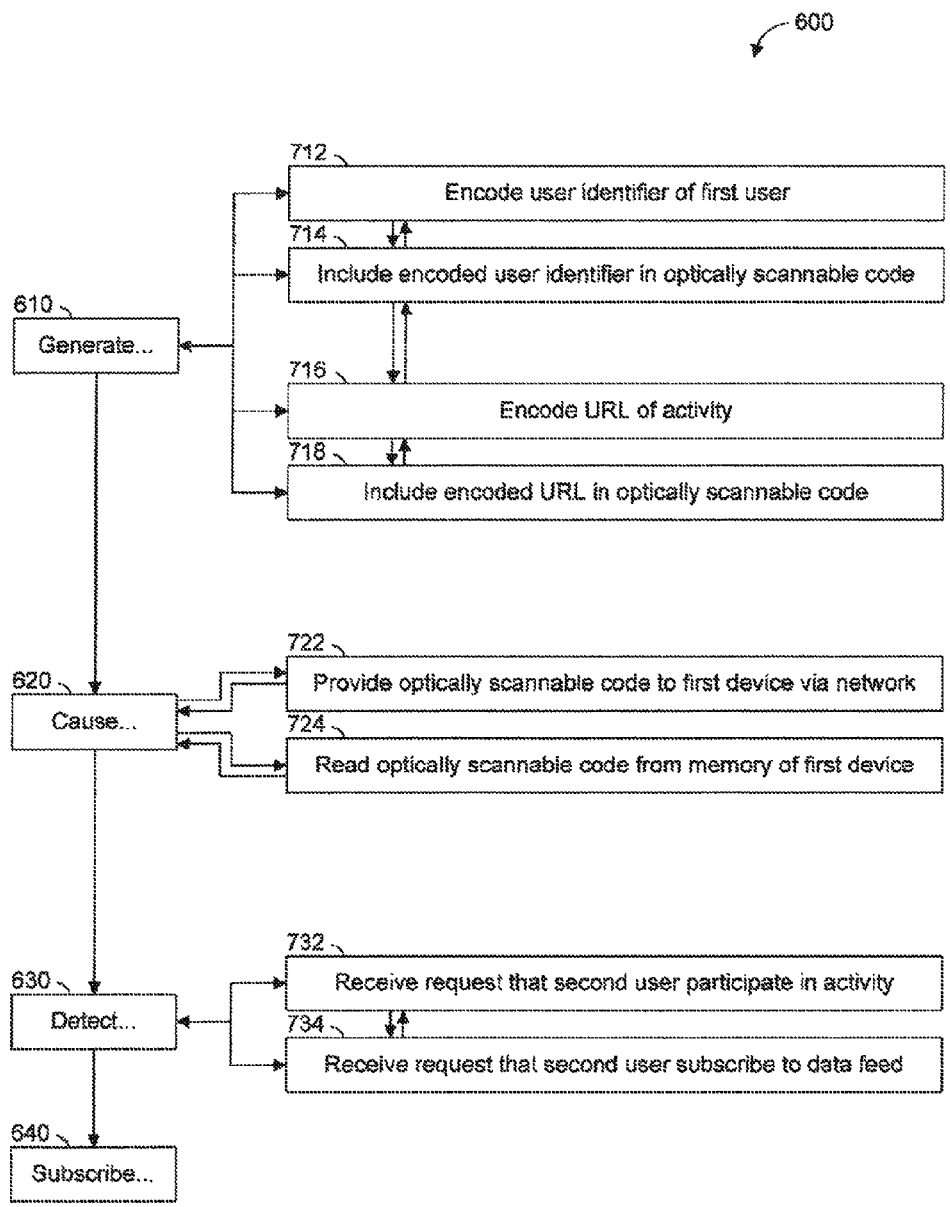
Figure 8:
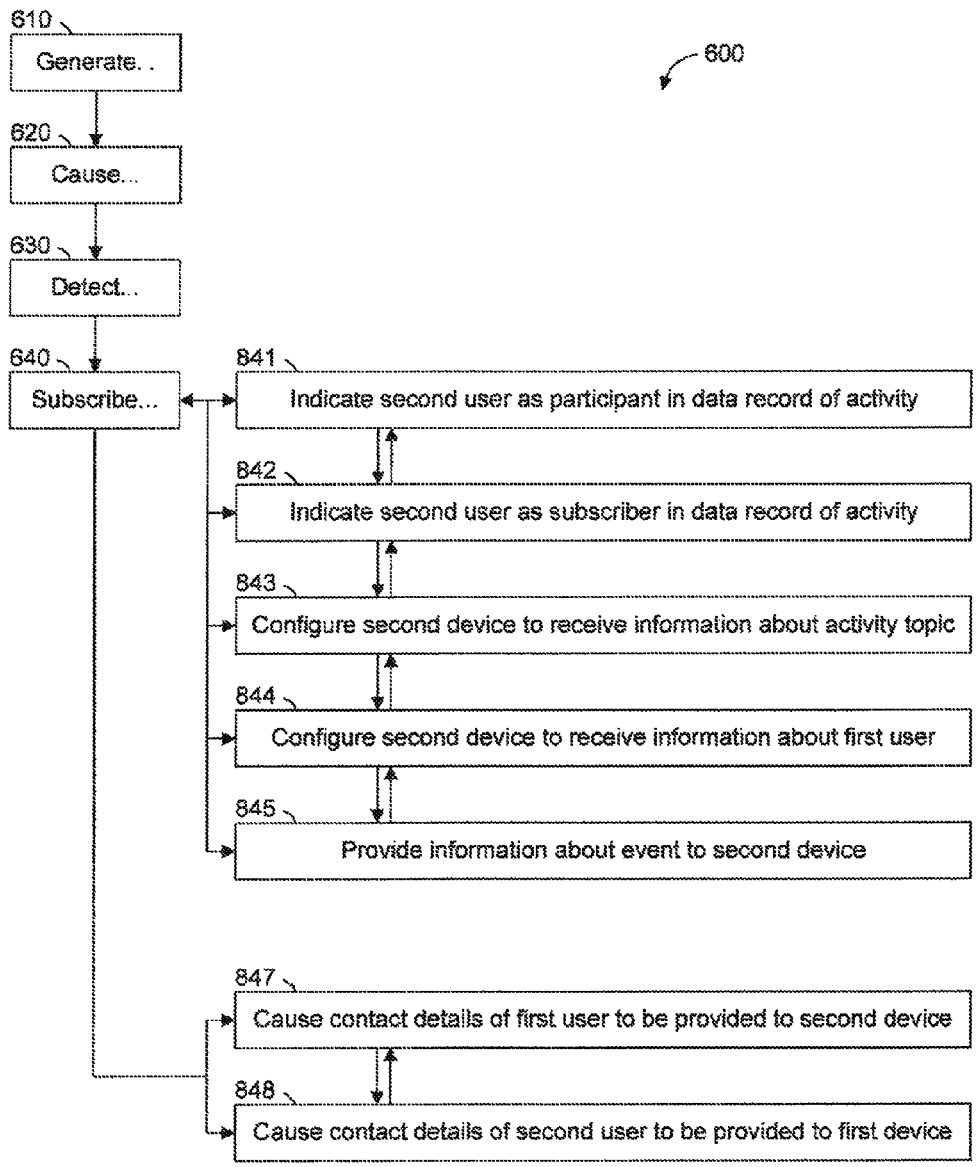

FIG. 6-8 are flowcharts illustrating operations (e.g., of the server machine 110, the device 130, and the device 150, or any suitable combination thereof) in a method 600 of subscribing the user 152 to an activity or to a data feed for an activity, according to some example embodiments. According to various example implementations of the method 600, operations in a method 600 may be performed by modules described above with respect to FIG. 2-4. According to various example embodiments, some or all of these modules may be included in the server machine 110, the device 130, or the device 150, or distributed across any suitable combination thereof. As shown in FIG. 6, the method 600 includes operations 610, 620, 630, and 640.

In operation 610, the encoder module 210 generates the optically scannable code 500 that encodes the activity identifier 510. For example, the encoder module 210 may access the activity identifier 510 (e.g., from the database 115) and create the optically scannable code 500 based on the accessed activity identifier 510. As noted above, the activity identifier 510 identifies an activity, and the activity may correspond to the user 132 (e.g., first user).

In operation 620, the encoder module 210 causes the optically scannable code 500 to be accessed by the device 130 (e.g., first device). For example, the encoder module 210 may cause the device 130 to access (e.g., from the server machine 110, from the database 115, or from a memory of the device 130) the optically scannable code 500 and present the optically scannable code 500 (e.g., to the device 150). As noted above, the device 130 may be a device of the user 132. Moreover, the device 130 may be configured (e.g., by the encoder module 210 or by a software application, applet, or app) to present the optically scannable code 500 generated in operation 610 (e.g., via the display screen 240, the printer device 290, or both). In some example embodiments, operation 620 includes causing the device 130 to present the optically scannable code 500 (e.g., in a manner that is optically scannable by the device 150).

In operation 630, the detector module 220 detects that the device 150 (e.g., second device) has optically scanned the optically scannable code 500 (e.g., by receiving a notification that includes the activity identifier 510, where the notification may include a further identifier of the user 152, of the device 150, or of both). As noted above, the optically scannable code 500 may be presented by the device 130 (e.g., via the display screen 240 or via the printer device 290), and this presentation of the optically scannable code 500 may be with a sufficiently clear line-of-sight between the devices 130 and 150. Moreover, the device 150 may be configured to decode (e.g., via the decoder module 260) the activity identifier 510 encoded in the optically scannable code 500.

In operation 640, the subscription module 230 subscribes the user 152 to a data feed that corresponds to the activity identified by the activity identifier 510, which may be encoded in the optically scannable code 500. As noted above, the user 152 is associated with the device 150 (e.g., second device) that optically scanned the optically scannable code 500. For example, the user 152 may be a user of (e.g., owner of, or primary user of) the device 150. Accordingly, a detection that the device 150 has optically scanned the optically scannable code 500 may be sufficient to infer that the user 152 is to be subscribed to the data feed. In some example embodiments, the optically scannable code 500 is decoded by the decoder module 260. As noted above, the decoder module 260 may be implemented within the device 150.

As shown in FIG. 7, the method 600 may include one or more of operations 712, 714, 716, 718, 722, 724, 732, and 734. One or more of operations 712-718 may be performed as part (e.g., a precursor task, a subroutine, or a portion) of operation 610, in which the encoder module 210 generates the optically scannable code 500.

In operation 712, the encoder module 210 encodes a user identifier (e.g., UUID) of the user 132 (e.g., first user). In operation 714, the encoder module 210 includes the encoded user identifier within the optically scannable code 500. As noted above, the user 132 may correspond to the activity identified by the activity identifier 510 (e.g., as a participant, a subscriber, a host, a member, an attendee, a moderator, an administrator, a manager, or any suitable combination thereof).

In operation 716, the encoder module 210 encodes the URL 512 of the activity (e.g., a URL of a website or document that provides information about the activity). In operation 718, the encoder module 210 includes the encoded URL within the optically scannable code 500. According to certain example embodiments, the URL 512 may form all or part of the activity identifier 510 within the optically scannable code 500.

In example embodiments where the encoder module 210 is implemented in the server machine 110, operation 722 may be performed as part of operation 620, in which the encoder module 210 causes the optically scannable code 500 to be access by the device 130. In operation 722, the encoder module 210 provides the optically scannable code 500 to the device 130 via the network 190. According to some example embodiments, operation 722 may be performed in response to a request (e.g., received by the server machine 110 from the device 130) that the optically scannable code 500 be provided to the device 130.

In example embodiments where the encoder module 210 is implemented in the device 130, operation 724 may be performed as part of operation 620, in which the encoder module 210 causes the optically scannable code 500 to be accessed by the device 130. In operation 724, the encoder module 210 accesses (e.g., reads) the optically scannable code 500 from a memory of the device 130. In some example embodiments, operation 724 may be performed in response to operation 610 (e.g., completion of operation 610).

One or more of operations 732 and 734 may be performed as part of operation 630, in which the detector module 220 detects that the device 150 has optically scanned the optically scannable code 500. In operation 732, the detector module 220 receives a request that the user 152 become a participant in the activity identified by the activity identifier 510. For example, the request may include the activity identifier 510, and an identifier (e.g., a further identifier) of the user 152, of the device 150, or both. In some example embodiments that include operation 732, the device 150 (e.g., via the request module 270) may be configured to provide this request in response to an optical scan (e.g., by the camera 250) of the optically scannable code 500 (e.g., as presented by the device 130). According to various example embodiments, such a request may take the form of one or more calls to an application program interface (API) that is supported, in whole or in part, by the detector module 220. For example, the detector module 220 may receive an API call requesting that the user 152 become a participant in the activity.

In operation 734, the detector module 220 receives a request (e.g., another request) that the user 152 becomes a subscriber to the data feed that corresponds to the activity identified by the activity identifier 510. In certain example embodiments that include operation 734, the device 150 (e.g., by the request module 270) may be configured to provide this request in response to an optical scanning (e.g., by the camera 250) of the optically scannable code 500 (e.g., as presented by the device 130). According to various example embodiments, such a request may take the form of one or more calls to an API that is supported, fully or partially, by the detector module 220. For example, the detector module 220 may receive an API call requesting that the user 152 become a subscriber to the data feed.

As shown in FIG. 8, the method 600 may include one or more of operations 841, 842, 843, 844, 845, 847, and 848. One or more of operations 841-845 may be performed as part of operation 640, in which the subscription module 230 subscribes the user 152 to the data feed that corresponds to the activity identified by the activity identifier 510, which may be encoded in the optically scannable code 500 decoded by the device 150 (e.g., via the decoder module 260).

In operation 841, the subscription module 230 indicates within a data record of the activity (e.g., stored in the database 115) that the user 152 is a participant in the activity. For example, the subscription module 230 may update the data record to include an identifier (e.g., user identifier) of the user 152, or a reference (e.g., a pointer) to such an identifier of the user 152. The updated data records may therefore indicate that the user 152 is a participant in the activity (e.g., as a member or as an attendee).

In operation 842, the subscription module 230 indicates within a data record (e.g., another data record stored in the database 115) of the activity that the user 152 is a subscriber to the data feed that corresponds to the activity. For example, the subscription module 230 may update the data record to include an identifier of the user 152, or a reference to such an identifier of the user 152. The updated data record may therefore indicate that the user 152 is a subscriber of the data feed for the activity.

In operation 843, the subscription module 230 configures the device 150 to receive information about a topic (e.g., activity topic or discussion topic) of the activity. As noted above, configuration of the device 150 may include configuring or updating the software application, applet, or app that is executable on the device 150. For example, operation 843 may involve setting a preference that the topic of the activity be included in a list of active topics for which information is to be retrieved by the device 150 for presentation to the user 152.

In operation 844, the subscription module 230 configures the device 150 to receive information about the user 132. As noted above, the user 132 may correspond to the activity (e.g., as a participant, a subscriber, a host, a member, an attendee, a moderator, an administrator, a manager, or any suitable combination thereof). For example, operation 844 may involve creating a virtual business card that corresponds to the user 132 within a contacts database stored on the device 150.

According to various example embodiments, the subscription of the user 152 to the data feed, as performed in operation 640, automatically triggers a one-way or two-way communication of contact details. In some example embodiments, operation 847 is performed in response to operation 640. In operation 847, the subscription module 230 causes contact details of the user 132 (e.g., name, address, phone number, and email address for the user 132) to be provided to the device 150. This may have the effect of enabling the newly subscribed user 152 to gain contact details for the user 132, who is associated with the newly subscribed activity for the user 142. In certain example embodiments, operation 848 is performed in response to operation 640. In operation 848, the subscription module 230 causes contact details of the user 152 (e.g., name, address, phone number, an email address for the user 152) to be provided to the device 130. This may have the effect of enabling the user 132, who is associated with the activity, to gain contact details of the user 152, was newly subscribed to the data feed for the activity.

According to various example embodiments, one or more of the methodologies described herein may facilitate subscription of users to various activities. For example, users may follow each other's data feeds and exchange contact information by scanning QR codes presented by each other's devices. Moreover, one or more of the methodologies described herein may facilitate connecting a user with an activity by scanning QR code for that activity. Hence, one or more the methodologies described herein may facilitate quick and convenient subscription of users to data feeds for activities, as well as quick and convenient joining of users to activities (e.g., as participants or as attendees). Furthermore, the use of optically scannable codes may have the effect of increasing privacy, at least because the methodologies described herein involve a user presenting an optically scannable code on his device and therefore having considerable control over the lines-of-sight to that device.

When these effects are considered in aggregate, one or more of the methodologies described herein may obviate a need for certain efforts or resources that otherwise would be involved in subscribing users to activities. Efforts expended by a user in getting subscribed to activity may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
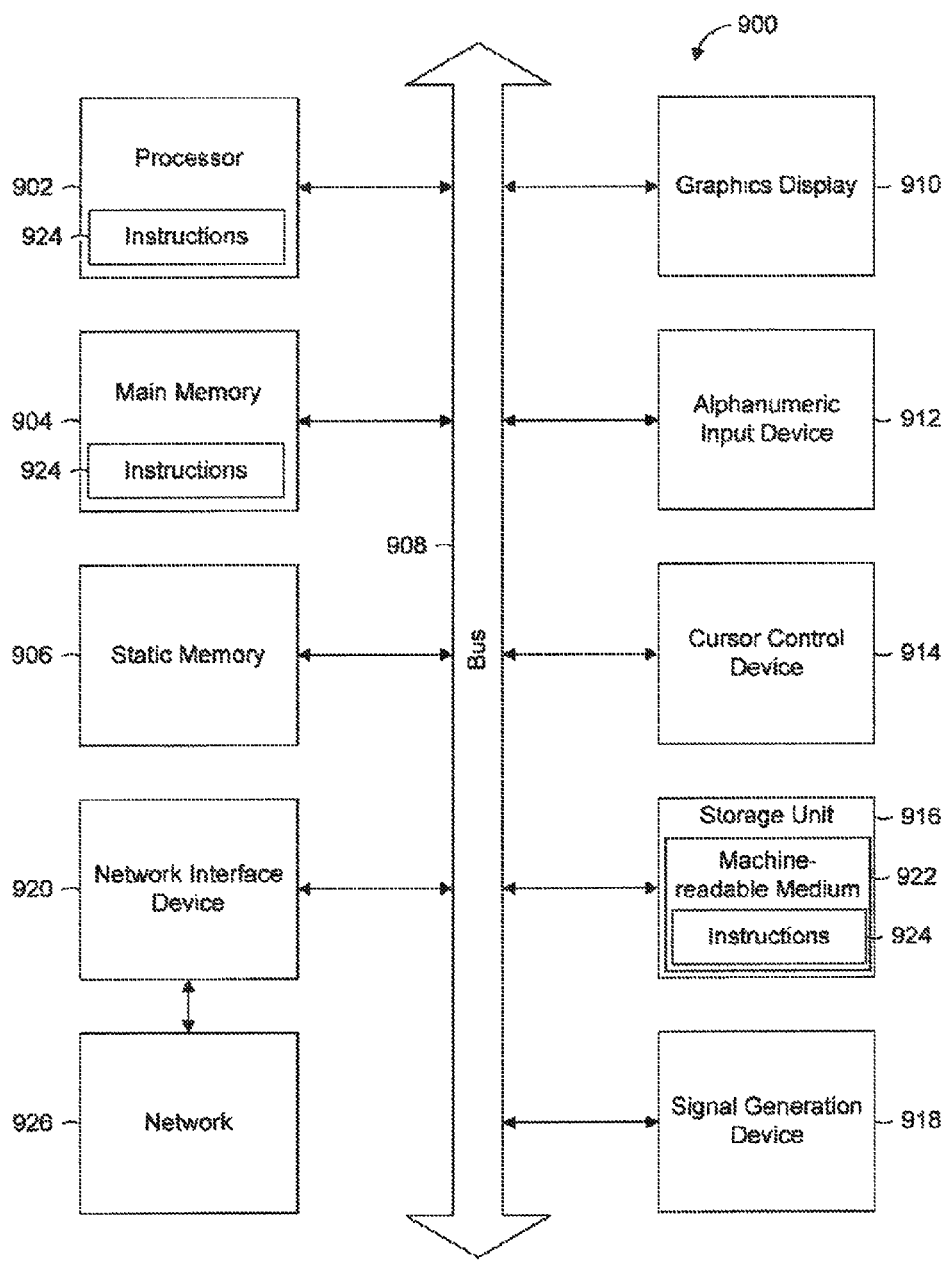
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, by that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured to instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software)

or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are example of techniques used by those of ordinary skill in the data processing arts to convey the substrate of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, non-transitory machine-readable media, and systems (e.g., apparatus) discussed herein:

1. A method comprising:
generating an optically scannable code that encodes an activity identifier of an activity that corresponds to a first user;
causing the optically scannable code that encodes the activity identifier to be accessed by a first device of the first user, the first device being configured to present the optically scannable code;
detecting that a second device of a second user optically scanned the optically scannable code presented by the first device of the first user, the second device being configured to decode the activity identifier of the activity that corresponds to the first user; and
subscribing the second user to a data feed that corresponds to the activity identified by the activity identifier encoded in the optically scannable code decoded by the second device of the second user, the subscribing of the second user being performed by a processor of a machine.

2. The method of description 1, wherein:
the generating of the optically scannable code includes:
encoding a user identifier of the first user that corresponds to the activity; and
including the encoded user identifier within the optically scannable code.

3. The method of description 1 or description 2, wherein:
the generating of the optically scannable code includes:
encoding a uniform resource locator (URL) of the activity; and
including the URL of the activity as the activity identifier within the optically scannable code.

4. The method of any of descriptions 1-3, wherein:
the causing of the optically scannable code to be accessed by the first device includes providing the optically scannable code to the first device via a network.

5. The method of any of descriptions 1-3, wherein:
the causing of the optically scannable code to be accessed by the first device includes reading the optically scannable code from a memory of the first device.

6. The method of any of descriptions 1-5, wherein:
the detecting that the second device optically scanned the optically scannable code includes receiving a request that the second user become a participant in the activity identified by the activity identifier; and
the second device is configured to provide the request in response to an optical scan of the optically scannable code.

7. The method of any of descriptions 1-6, wherein:
the detecting that the second device optically scanned the optically scannable code includes receiving a request that the second user become a subscriber to the data feed that corresponds to the activity identified by the activity identifier; and
the second device is configured to provide the request in response to an optical scan of the optically scannable code.

8. The method of any of descriptions 1-7, wherein:
the subscribing of the second user to the data feed that corresponds to the activity includes indicating the second user as a participant in the activity within a data record that corresponds to the activity.

9. The method of any of descriptions 1-7, wherein:
the subscribing of the second user to the data feed that corresponds to the activity includes indicating the second user as a subscriber to the data feed within a data record that corresponds to the data feed.

10. The method of any of descriptions 1-9, wherein:
the subscribing of the second user to the data feed that corresponds to the activity includes configuring the second device to receive information about a topic of the activity.

11. The method of any of descriptions 1-10, wherein:
the subscribing of the second user to the data feed that corresponds to the activity includes configuring the second device to receive information about the first user.

12. The method of any of descriptions 1-11 further comprising:
causing contact details of the first user to be provided to the second device of the second user in response to the subscribing of the second user to the data feed that corresponds to the activity.

13. The method of any of descriptions 1-12 further comprising:
causing contact details of the second user to be provided to the first device of the first user in response to the subscribing of the second user to the data feed that corresponds to the activity.

14. The method of any of descriptions 1-13, wherein:
the first device is configured to present the optically scannable code by displaying the optically scannable code that encodes the activity identifier on a display screen of the first device; and
the second device is configured to optically scan the optically scannable code displayed on the display screen of the first device.

15. The method of any of descriptions 1-13, wherein:
the first device is configured to present the optically scannable code by causing the optically scannable code that encodes the activity identifier to be printed by a printer device; and
the second device is configured to optically scan the optically scannable code printed by the printer device.

16. A non-transitory machine-readable storage medium comprising instructions that, when executed by one or more processors of a machine, cause the machine to perform operations comprising:
generating an optically scannable code that encodes an activity identifier of an activity that corresponds to a first user;
causing the optically scannable code that encodes the activity identifier to be accessed by a first device of the first user, the first device being configured to present the optically scannable code;
detecting that a second device of a second user optically scanned the optically scannable code presented by the first device of the first user, the second device being configured to decode the activity identifier of the activity that corresponds to the first user; and
subscribing the second user to a data feed that corresponds to the activity identified by the activity identifier encoded in the optically scannable code decoded by the second device of the second user, the subscribing of the second using being performed by the one or more processors of the machine.

17. The non-transitory machine-readable storage medium of description 16, wherein:
the generating of the optically scannable code includes:
encoding a user identifier of the first user that corresponds to the activity; and
including the encoded user identifier within the optically scannable code.

18. A system comprising:
an encoder module configured to:
generate an optically scannable code that encodes an activity identifier of an activity that corresponds to a first user; and
cause the optically scannable code that encodes the activity identifier to be accessed by a first device of the first user, the first device being configured to present the optically scannable code;
a detector module configured to detect that a second device of a second user optically scanned the optically scannable code presented by the first device of the first user, the second device being configured to decode the activity identifier of the activity that corresponds to the first user; and
a processor configured by a subscription module to subscribe the second user to a data feed that corresponds to the activity identified by the activity identifier encoded in the optically scannable code decoded by the second device of the second user.

19. The system of description 18, wherein:
the encoder module is configured to:
encode a user identifier of the first user that corresponds to the activity; and
include the encoded user identifier within the optically scannable code.

20. The system of description 18 or description 19, wherein:
the activity that corresponds to the first user is an event in which the first user is a participant; and
the subscription module configures the processor to provide information about the event to the second device of the second user.

21. A method comprising:
accessing an activity identifier of an activity that corresponds to a first user;
generating an optically scannable code that encodes the activity identifier, the generating of the optically scannable code being performed by a processor of a machine; and
causing the optically scannable code to be presented by a first device of the first user;
wherein the first device is configured to present the optically scannable code to a second device of a second user to allow the second user to be subscribed to a data feed that corresponds to the activity;
wherein the second device is configured to optically scan and decode the optically scannable code; and
wherein the second user is subscribed to the data feed that corresponds to the activity based on the second device decoding the optically scannable code.

22. The method of description 21, wherein:
the machine that generates the optically scannable code is a server machine.

23. The method of description 21, wherein:
the machine that generates the optically scannable code is the first device of the first user.

24. The method of description 21, wherein:
the machine that generates the optically scannable code is the second device of the second user.

25. The method of any of descriptions 21, 22, or 24, wherein:
the causing of the optically scannable code to be presented by the first device includes providing the optically scannable code to the first device via a network.

26. The method of any of descriptions 21 or 23, wherein:
the causing of the optically scannable code to be presented by the first device includes reading the optically scannable code from a memory of the first device.

27. The method of any of descriptions 21-26 further comprising:

detecting that the second device optically scanned the optically scannable code by receiving a request that the second user become a participant in the activity identified by the activity identifier; wherein
the second device is configured to provide the request based on an optical scan of the optically scannable code.

28. The method of any of descriptions 21-27 further comprising:
detecting that the second device optically scanned the optically scannable code by receiving a request that the second user become a subscriber to the data feed that corresponds to the activity identified by the activity identifier; wherein
the second device is configured to provide the request based on an optical scan of the optically scannable code.

29. The method of any of descriptions 21-28 further comprising:
subscribing the second user to the data feed that corresponds to the activity by indicating the second user as a participant in the activity within a data record that corresponds to the activity.

30. The method of any of descriptions 21-29 further comprising:
subscribing the second user to the data feed that corresponds to the activity by indicating the second user as a subscriber to the data feed within a data record that corresponds to the data feed.

31. The method of any of descriptions 21-30 further comprising:
configuring the second device to receive information about a topic of the activity.

32. The method of any of descriptions 21-31 further comprising:
configuring the second device to receive information about the first user.

33. The method of any of descriptions 21-32 further comprising:
causing contact details of the first user to be provided to the second device of the second user in response to the second user being subscribed to the data feed that corresponds to the activity.

34. The method of any of descriptions 21-33 further comprising:
causing contact details of the second user to be provided to the first device of the first user in response to the second user being subscribed to the data feed that corresponds to the activity.

35. The method of any of descriptions 21-34, wherein:
the first device is configured to present the optically scannable code by displaying the optically scannable code on a display screen of the first device; and
the second device is configured to optically scan the optically scannable code from the display screen of the first device.

36. The method of any of descriptions 21-35, wherein:
the first device is configured to present the optically scannable code by causing the optically scannable code that encodes the activity identifier to be printed by a printer device; and
the second device is configured to optically scan the optically scannable code printed by the printer device.

37. A non-transitory machine-readable storage medium comprising instructions that, when executed by one or more processors of a machine, cause the machine to perform operations comprising:
accessing the activity identifier of an activity that corresponds to a first user;
generating an optically scannable code that encodes the activity identifier, the generating of the optically scannable code being performed by the one or more processors of the machine; and
causing the optically scannable code to be presented by a first device of the first user;
wherein the first device is configured to present the optically scannable code to a second device of a second user (e.g., to allow the second user to be subscribed to a data feed that corresponds to the activity);
wherein the second device is configured to optically scan and decode the optically scannable code; and
wherein the second user is subscribed to a data feed that corresponds to the activity based on the second device decoding the optically scannable code.

38. A device comprising:
a processor configured by an encoder module to:
access an activity identifier of an activity that corresponds to a first user; and
generate an optically scannable code that encodes the activity identifier; and
a display screen configured to present the optically scannable code to a further device of a second user (e.g., to allow the second user to be subscribed to a data feed that corresponds to the activity);
wherein the second device is configured to optically scan and decode the optically scannable code; and
wherein the second user is subscribed to the data feed that corresponds to the activity based on the second device decoding the optically scannable code.

39. The device of description 38 further comprising:
a detector module configured to receive a request that the second user become a participant in the activity identified by the activity identifier; wherein
the second device is configured to provide the request based on an optical scan of the optically scannable code.

40. The device of description 38 or description 39 further comprising:
a detector module configured to receive a request that the second user become a subscriber to the data feed that corresponds to the activity identified by the activity identifier; wherein
the second device is configured to provide the request based on an optical scan of the optically scannable code.

41. The device of any of descriptions 38-40 further comprising:
a subscription module configured to indicate the second user as a participant in the activity within a data record that corresponds to the activity.

42. The device of any of descriptions 38-40 further comprising:
a subscription module configured to indicate the second user as a subscriber to the data feed within a data record that corresponds to the data feed

What is claimed is:
1. A method comprising:
accessing an activity identifier of an activity that corresponds to a first user;
generating an optically scannable code that encodes the activity identifier, the generating of the optically scannable code being performed by a processor of a machine; and
causing the optically scannable code to be presented by a first device of the first user, wherein the first device is configured to present the optically scannable code to a second device of a second user to allow the second user to be subscribed to a data feed that corresponds to the activity.

2. The method of claim 1, wherein:
the machine that generates the optically scannable code is a server machine.

3. The method of claim 1, wherein:
the machine that generates the optically scannable code is the first device of the first user.

4. The method of claim 1, wherein:
the machine that generates the optically scannable code is the second device of the second user.

5. The method of claim 1, wherein:
the causing of the optically scannable code to be presented by the first device includes providing the optically scannable code to the first device via a network.

6. The method of claim 1, wherein:
the causing of the optically scannable code to be presented by the first device includes reading all the optically scannable code from a memory of the first device.

7. The method of claim 1 further comprising:
detecting that the second device optically scanned the optically scannable code by receiving a request that the second user become a participant in the activity identified by the activity identifier; wherein
the second device is configured to provide the request based on an optical scan of the optically scannable code.

8. The method of claim 1 further comprising:
detecting that the second device optically scanned the optically scannable code by receiving a request that the second user become a subscriber to the data feed that corresponds to the activity identifier by the activity identifier; wherein
the second device is configured to provide the request based on an optical scan of the optically scannable code.

9. The method of claim 1 further comprising:
subscribing the second user to the data feed that corresponds to the activity by indicating the second user as a participant in the activity within a data record that corresponds to the activity.

10. The method of claim 1 further comprising:
subscribing the second user to the data feed that corresponds to the activity by indicating the second user as a subscriber to the data feed within a data record that corresponds to the data feed.

11. The method of claim 1 further comprising:
configuring the second device to receive information about a topic of the activity.

12. The method of claim 1 further comprising:
configuring the second device to receive information about the first user.

13. The method of claim 1 further comprising:
causing contact details of the first user to be provided to the second device of the second user in response to the second user being subscribed to the data feed that corresponds to the activity.

14. The method of claim 1 further comprising:
causing contact details of the second user to be provided to the first device of the first user in response to the second user being subscribed to the data feed that corresponds to the activity.

15. The method of claim 1, wherein:
the first device is configured to present the optically scannable code by displaying the optically scannable code on a display screen of the first device; and
the second device is configured to optically scan the optically scannable code from the display screen of the first device.

16. The method of claim 1, wherein:
the first device is configured to present the optically scannable code by causing the optically scannable code that encodes the activity identifier to be printed by a printer device; and
the second device is configured to optically scan the optically scannable code printed by the printer device.

17. A non-transitory machine-readable storage medium comprising instructions that, when executed by one or more processors of a machine, cause the machine to perform operations comprising:
accessing an activity identifier of an activity that corresponds to a first user;
generating an optically scannable code that encodes the activity identifier; and
causing the optically scannable code to be presented by a first device of the first user, wherein the first device is configured to present the optically scannable code to a second device of a second user to allow the second user to be subscribed to a data feed that corresponds the activity.

18. A system comprising:
an encoder module configured to:
  generate an optically scannable code that encodes an activity identifier of an activity that corresponds to a first user; and
  cause the optically scannable code that encodes the activity identifier to be accessed by a first device of the first user,
    the first device being configured to present the optically scannable code;
a detector module configured to detect that a second device of a second user optically scanned the optically scannable code presented by the first device of the first user,
  the second device being configured to decode the activity identifier of the activity that corresponds to the first user; and
processor configured by a subscription module to subscribe the second user to a data feed that corresponds to the activity identified by the activity identifier encoded in the optically scannable code decoded by the second device of the second user.

19. The system of claim 18, wherein:
the encoder module is configured to:
  encode a user identifier of the first user that corresponds to the activity; and
  include the encoded user identifier within the optically scannable code.

20. The system of claim 18, wherein:
the activity that corresponds to the first user is an event in which the first user is a participant; and
the subscription module configures the processor to provide information about the event to the second device of the second user.

21. A device comprising:
a processor configured by an encoder module to:
  access an activity identifier of an activity that corresponds to a first user; and
  generate an optically scannable code that encodes the activity identifier; and
a display screen configured to present the optically scannable code to a further device of a second user;
  wherein the second device is configured to optically scan and decode the optically scannable code; and wherein the second user is subscribed to a data feed that corresponds to the activity based on the second device decoding the optically scannable code.

22. The device of claim 21 further comprising:
a detector module configured to receive a request that the second user become a participant in the activity identified by the activity identifier; wherein
the second device is configured to provide the request based on an optical scan of the optically scannable code.

23. The device of claim 21 further comprising:
a detector module configured to receive a request that the second user become a subscriber to the data feed that corresponds to the activity identified by the activity identifier; wherein
the second device is configured to provide the request based on an optical scan of the optically scannable code.

24. The device of claim 21 further comprising:
a subscription module configured to indicate the second user as a participant in the activity within a data record that corresponds to the activity.

25. The device of claim 21 further comprising:
a subscription module configured to indicate the second user as a subscriber to the data feed within a data record that corresponds to the data feed.

* * * * *

UNITED STATES PATENT AND TRADEMARK OFFICE
CERTIFICATE OF CORRECTION

PATENT NO. : 8,814,037 B2  
APPLICATION NO. : 13/665108  
DATED : August 26, 2014  
INVENTOR(S) : Ingrid Duquenoy-bernaudin et al.

Page 1 of 1

It is certified that error appears in the above-identified patent and that said Letters Patent is hereby corrected as shown below:

On the Title page, in column 1, under "Assignee (73)", line 1, delete "SAP AG, Walldorf (DE)" and insert --Business Objects Software Ltd., Dublin (IE)--, therefor Signed and Sealed this  
Twenty-first Day of April, 2015

Michelle K. Lee  
*Director of the United States Patent and Trademark Office*